US008655465B2

(12) United States Patent
Repko

(10) Patent No.: US 8,655,465 B2
(45) Date of Patent: Feb. 18, 2014

(54) METHOD AND ELECTRONIC DEVICE

(75) Inventor: Wilfred Repko, Hilversum (NL)

(73) Assignee: NXP B.V., Eindhoven (NL)

( * ) Notice: Subject to any disclaimer, the term of this patent is extended or adjusted under 35 U.S.C. 154(b) by 1191 days.

(21) Appl. No.: 12/529,774

(22) PCT Filed: Feb. 21, 2008

(86) PCT No.: PCT/IB2008/050624
§ 371 (c)(1),
(2), (4) Date: Sep. 3, 2009

(87) PCT Pub. No.: WO2008/110951
PCT Pub. Date: Sep. 18, 2008

(65) Prior Publication Data
US 2010/0094442 A1 Apr. 15, 2010

(30) Foreign Application Priority Data
Mar. 13, 2007 (EP) ..................................... 07005137

(51) Int. Cl.
*G06F 17/00* (2006.01)
(52) U.S. Cl.
USPC .................................. 700/94; 381/58; 381/86
(58) Field of Classification Search
USPC .......................................................... 700/94
See application file for complete search history.

(56) References Cited

U.S. PATENT DOCUMENTS

| 2003/0188005 | A1 | 10/2003 | Yoneda et al. |
| 2004/0209655 | A1 | 10/2004 | Kubo |
| 2006/0245364 | A1 | 11/2006 | Zhu et al. |
| 2007/0015486 | A1 | 1/2007 | Marlowe |
| 2007/0077784 | A1* | 4/2007 | Kalayjian et al. ............... 439/61 |
| 2008/0154400 | A1* | 6/2008 | Wang .............................. 700/94 |

FOREIGN PATENT DOCUMENTS

| CN | 1536778 A | 10/2004 |
| EP | 1698518 A2 | 9/2006 |

* cited by examiner

*Primary Examiner* — Joseph Saunders, Jr.

(57) ABSTRACT

The invention relates to a method and an electronic device especially for car audio entertainment including a car audio equipment (2) and an other electronic device (4) like a handheld including at least one data connection (5) and at least one control connection (3) between the car audio equipment and the other electronic device, whereby the car audio equipment is able to send data to the other electronic device which is able to respond to the data send by the car audio equipment by sending a data answer, wherein the car audio equipment is able to compare the data send and the data received and generates a control signal to allow the control of the other electronic device like the handheld by the car audio equipment.

16 Claims, 3 Drawing Sheets

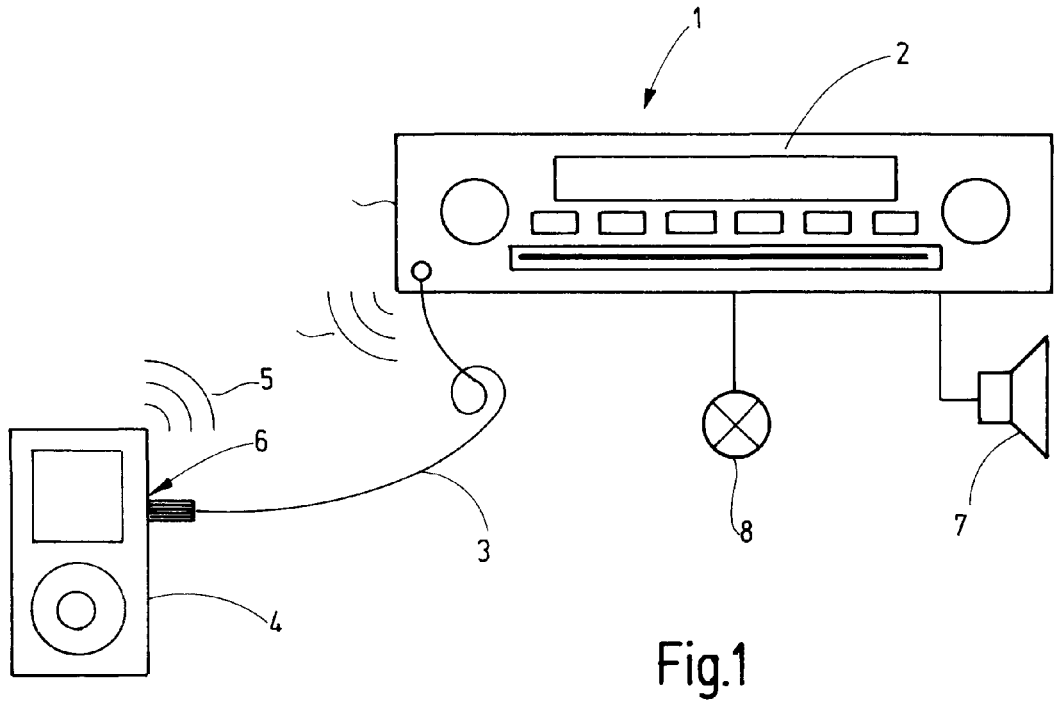
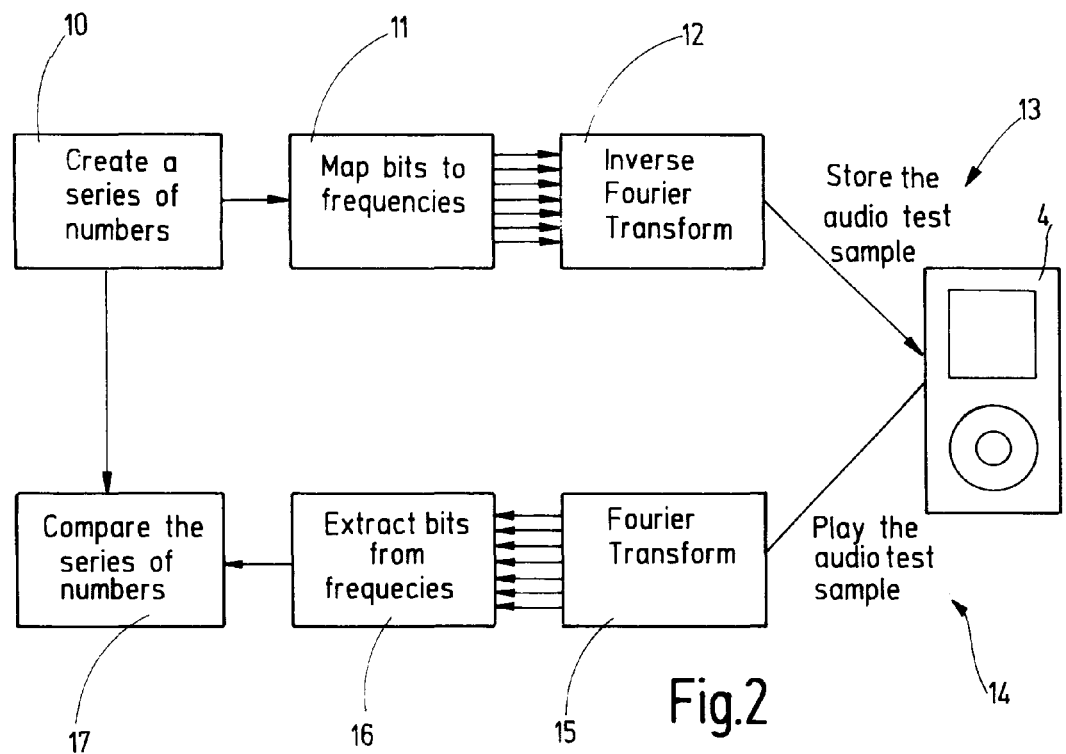

METHOD AND ELECTRONIC DEVICE

FIELD OF THE INVENTION

The invention relates to an electronic device, especially to an audio device of a car and more specifically of a car audio equipment. Furthermore the invention relates to a method of controlling an electronic device.

BACKGROUND OF THE INVENTION

Historically car audio equipment is self-contained without any cable interfaces to handheld devices. With the introduction of mobile phones there came a first need to smoothly interface these mobile phones to the car equipment. Operating these devices during driving the car has created a potential safety risk when the driver looses the attention to the traffic. For that reason all kind of CAR-Kits where introduced in order to keep better control via the controls of the car. With that CAR-Kits the mobile phone is installed e.g. in a docking station or the mobile phone is connected via wireless communication like Bluetooth to the CAR-Kit.

Now that modern handheld solid-state digital audio devices, like an iPod and MP3-players in general, are becoming more and more popular another connectivity problem arises. These devices usually do not have a wireless connectivity like Bluetooth that is being used for mobile phones to link up to the car equipment.

Besides this there are two other reasons why this is not appropriate. First of all the available bandwidth is insufficient to transport HiFi stereo audio signals. Secondly these devices provide copyright protection mechanisms to prevent copying copyrighted digital audio material.

This only leaves the option open to connect the device with an analogue audio link. A second digital link must be provided to enable the car controls to control the device. This however does not prevent to not connect the control link so that the user could still use the controls from the device and thus a safety risk is introduced again.

US 2006/0245364 A1 discloses a bi-directional continuous voice and video quality testing system for measuring a communication link.

EP 1698518 A2 discloses a multimedia device integration system for vehicles wherein the multimedia device integration system can control an external device like a CD-player or a digital media player and a control information is passed between the car stereo system and the external device.

US 2003/0188005 A1 discloses a data stream-distribution system between an audio player and a server.

SUMMARY OF THE INVENTION

It is an object of the invention to create an electronic device and a method to minimise the risk of using a mobile device e.g. a handheld while driving a car.

The above mentioned problems will be solved with the features of claim 1 and/or claim 7 accordingly. Therefore the problem according to the device will be solved using an electronic device especially for car audio entertainment including a car audio equipment and an other electronic device like a handheld including at least one data connection and at least one control connection between the car audio equipment and the other electronic device, wherein the car audio equipment is able to send data to the other electronic device which is able to respond to the data send by the car audio equipment by sending a data answer, wherein the car audio equipment is able to compare the data send and the data received and generates a control signal to allow the control of the other electronic device like a handheld by the car audio equipment.

According to the invention it is of advantage that the car audio equipment creates a series of numbers as a reference sample and/or the car audio equipment maps bits to frequencies of series of numbers of the reference sample. It is very advantageous that the car audio equipment creates an inverse transformation, in particular an inverse Fourier-Transformation, of the data.

Accordingly it is of advantage that the car audio equipment sends the reference sample to the other electronic device and the other electronic device stores the reference sample. Additionally it is very advantageous that the other electronic device plays back the audio test sample and the car audio equipment creates a transformation, in particular a Fourier-Transformation, of the data played back and extracts bits from the frequencies. This enables the system to recognise the ability to control the other electronic device via the car audio controls.

According to the invention the problem relating to the method will be solved by a method of controlling a electronic device by way of a car audio entertainment system including a car audio equipment and the other electronic device like a handheld including at least one data connection and at least one control connection between the car audio equipment and the other electronic device, wherein the car audio equipment sends data to the other electronic device which responds to the data send by the car audio equipment by sending a data answer, wherein the car audio equipment compares the data send and the data received and generates a control signal to allow the control of the other electronic device like a handheld by the car audio equipment. The method is of advantage if the car audio equipment creates a series of numbers as a reference sample and/or the car audio equipment maps bits to frequencies of series of numbers of the reference sample. In addition it is advantageous if the car audio equipment creates an inverse transformation, in particular an inverse Fourier-Transformation, of the data.

In addition it is advantageous according to the invention if the car audio equipment sends the reference sample to the other electronic device and the other electronic device stores the reference sample and/or the other electronic device plays back the audio test sample and the car audio equipment creates a transformation, in particular a Fourier-Transformation, of the data played back and extracts bits from the frequencies.

BRIEF DESCRIPTION OF THE DRAWINGS

The above and other features and advantages of the invention will be apparent from the following description of an exemplary embodiment of the invention with reference to the accompanying drawings, in which:

FIG. 1 shows a schematic view of the inventive device;

FIG. 2 shows a schematic view of a diagram showing the inventive method;

DETAILED DESCRIPTION OF THE DRAWINGS

Figure 3:
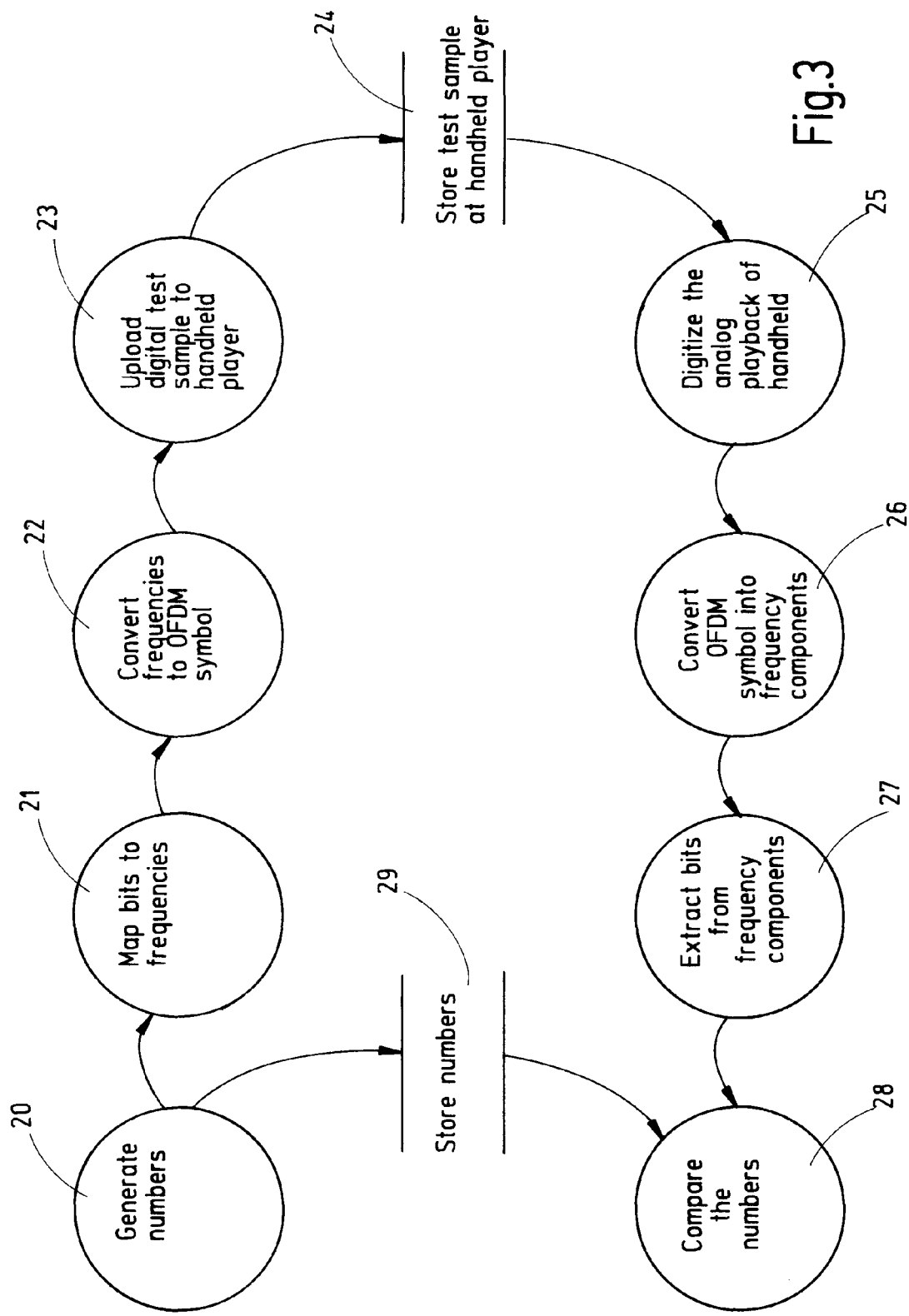
FIG. 3 shows a schematic view of a diagram showing the inventive method.

FIG. 1 shows a schematic view of the arrangement 1 according to the invention. A car audio equipment 2 is connected via a control link 3 to an other electronic device like a handheld digital audio player 4 that is capable to be controlled via this control link 3. A data link 5 is used to load a digital audio test sample from the car audio equipment 2 into the handheld player 4. Any type of digital link can be used for both the control link 3 and the data link 5, either wired e.g. a USB-link and/or a Firewire 1394-link or a wireless link e.g. a Bluetooth-link and/or a WiFi-link. Control link and data link can share the same link or can use separate links.

The analogue output 6 of the handheld digital player 4 is connected to the car equipment 2 to create an analogue audio link. This analogue link is used for two purposes:

1. Provide the analogue version of the digital test sample from the handheld device 4 for further analysis by the car equipment 2 and
2. Provide the playback sound (e.g. music or voice) that is recorded on the device 4.

The car audio equipment 2 uses the data link 5 to store a digital audio test sample on the handheld player 4. Subsequently the car audio equipment 2 instructs the player 4 via the control link 3 to playback the digital audio test sample e.g. by putting it in the play-list of the handheld device 4 or by putting diverse test samples between the music on the play-list. The playback of the test sample is inaudible to the user by muting the loudspeakers. The analogue converted test sample is being analysed on equivalence with the original digital version. If the equivalence is good enough then any other sound other then these test samples will be made audible to the loudspeakers 7. If the equivalence is insufficient, then the sound playback will be muted on the loudspeakers 7. Such a situation can be indicated to the user either by a visual signal 8, or audible signal e.g. a beep or a voice telling what was wrong.

For user convenience a special cable could be used that combines the controls link 3, the data link 5 and the analogue audio link connection via output 6 in one physical cable.

The analysis of the audio test sample can e.g. be done by digitizing the analogue output 6 of the handheld player 4 and do the analysis in the digital domain. Alternatively the digital test sample can be converted and compared with the output 6 of the handheld player 4 in analogue domain. The comparison in the digital domain could use OFDM (Orthogonal Frequency Division Modulation) techniques. The digital audio test sample is then made of a series of diverse OFDM-symbols. Each frequency component in each symbol can be modulated with QPSK (Quadrature Phase Shift Keying). When generating a unique (possibly random) binary number, this can be mapped to the states of all the frequency components in the OFDM symbol. By cascading the OFDM symbols, a long series of digital numbers is assembled and this creates a unique relationship with the analogue converted audio signal. Using FFT (Fast Fourier Transform) or DCT (Discrete Cosine Transform) techniques these symbols can be coded and decoded. The final analysis exists of comparing the original number with the re-assembled number after decoding. If at least a sufficient percentage of bits were re-assembled correctly then the analysis succeeded in recognizing the digital audio test sample over the analogue audio link via output 6. To make this analysis possible, the OFDM symbols may not be compressed with 'lossy' audio compression algorithms.

FIG. 2 displays a method of generating a test sample and comparing the test sample with a feedback sample of the handheld 4. The audio equipment 2 generates in block 10 a series of numbers. In block 11 the equipment maps bits to frequencies. In the next step in block 12, an inverse Fourier-Transformation will be done. In the following step in block 13, the inverted signal will be transferred to the handheld 4 which stores the audio test sample. Thereafter the handheld plays the audio test sample in block 14 and transfers the played signal to the car audio equipment 2. The played signal will be the subject of a Fourier-Transformation in block 15 and in block 16 the car audio equipment 2 will extract the bits from the frequencies. In block 17 the two signals from the car audio equipment directly and from the handheld will be compared. At the end, the system decides whether the signal send from the handheld is comparable to the signal send by the car audio equipment 2 and the transfer of data from the handheld will be allowed.

FIG. 3 displays a slightly different method of generating a test sample and comparing the test sample with a feedback sample of the handheld 4. The audio equipment 2 generates in block 20 a numbers or series of numbers. In block 21 the equipment 2 maps bits to frequencies. In the next step in block 22, the equipment converts frequencies to OFDM symbols. In the following step in block 23, the digital test sample will be uploaded to the handheld 4. The handheld stores the test sample in block 24. Thereafter the handheld 4 plays the audio test sample. In block 25 the analogue playback of the handheld 4 will be digitized. In the next step 26 the equipment will convert OFDM symbol into frequency components and in block 27 the system extracts bits from the frequency components. In block 28 the two signals from the car audio equipment directly and from the handheld will be compared. At the end, the system decides again whether the signal send from the handheld is comparable to the signal send by the car audio equipment 2 and the transfer of data from the handheld will be allowed.

Figure 4:
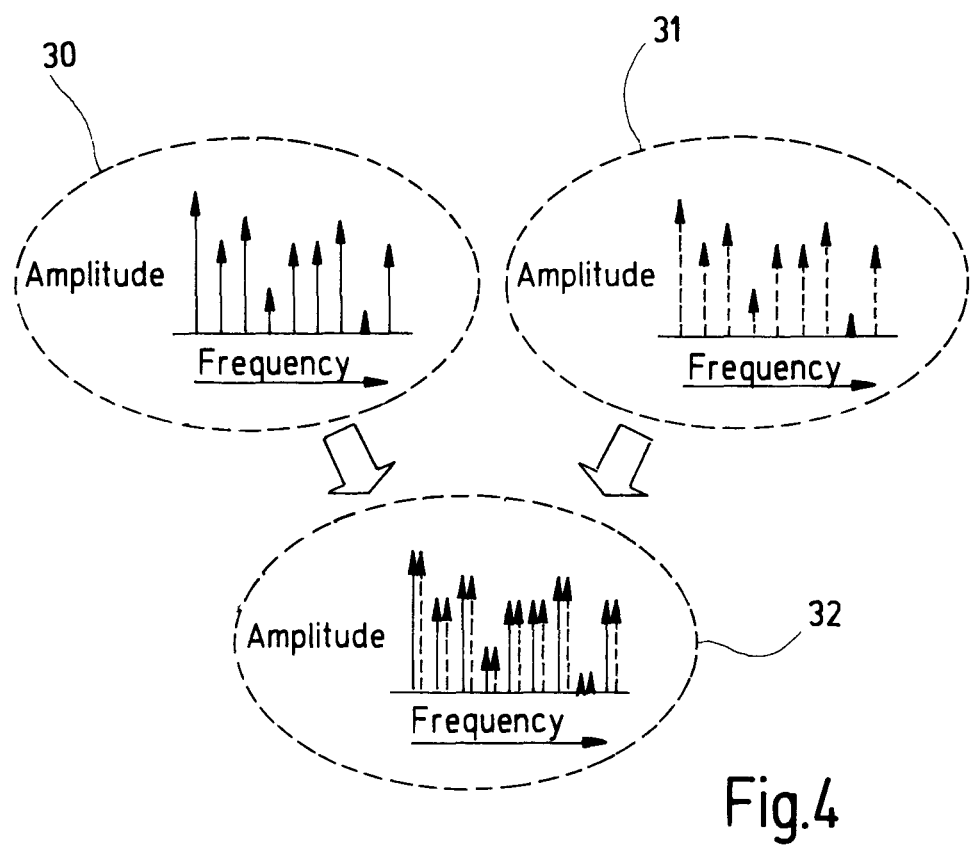
FIG. 4 shows a diagram.

FIG. 4 displays a comparison between the data send from the car audio equipment 2 and from the handheld 4. The bubble 30 discloses a set of data provided by the car audio equipment. A reference test audio sample having a print of discrete frequency components (one OFDM symbol). The bubble 31 discloses a set of data created by the handheld on the basis of received data from the car audio equipment. It shows a played back audio sample showing the same print of discrete frequency components (one OFDM symbol). Both bubbles show a set of amplitudes as a function of frequency. The bubble 32 discloses the merged set of data from both the car audio equipment and from the handheld. As it is seen, both set of data are almost identical. Therefore there is a match of the reference test audio sample and the audio sample being played back by the handheld. This means that the handheld correctly responds to the car audio test sample and to the car controls provided by the car audio equipment.

Figure 5:
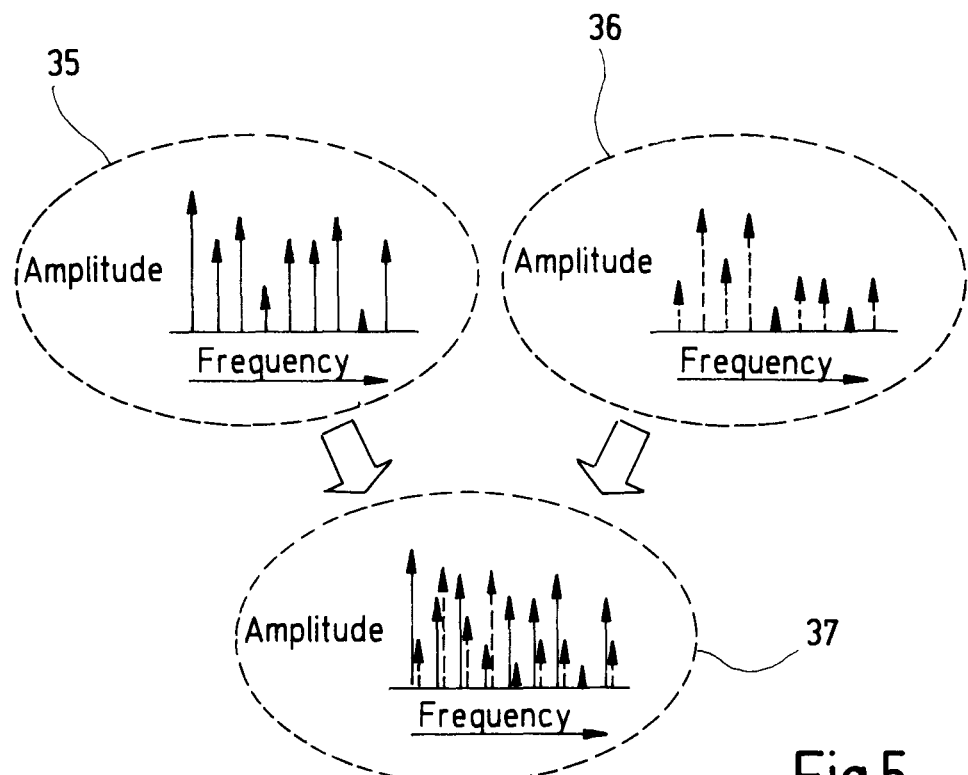
FIG. 5 shows a diagram.

FIG. 5 displays a comparison between the data send from the car audio equipment 2 and from the handheld 4. The bubble 35 discloses a set of data provided by the car audio equipment. A reference test audio sample having a print of discrete frequency components (one OFDM symbol). The bubble 36 discloses a set of data. It shows a played back audio sample showing a different print of discrete frequency components (one OFDM symbol). Both bubbles show a set of amplitudes as a function of frequency. The bubble 37 discloses the merged set of data from both the car audio equipment and from the handheld. As it is seen, both set of data are different. Therefore there is no match of the reference test audio sample and the audio sample being played back by the handheld. This means that the handheld does not correctly respond to the car audio test sample and to the car controls provided by the car audio equipment. Therefore the handheld does not correctly or does not completely respond to the car controls. The components showed in bubble 36 could be produced by e.g. music or speech being played back by the handheld.

The above mentioned Fourier-Transformation or inverse Fourier-Transformation is an example of a method encoding and decoding a series of numbers. Therefore other methods are maybe useful too, e.g. a Pseudorandom-Noise sequence correlation or others and the invention is not limited to the use of the Fourier-Transformation.

REFERENCES 1 arrangement according to the invention
2 car audio equipment
3 control link
4 other electronic device like a handheld
5 data link
6 analogue output
7 loudspeaker
8 visual signal device
10 block
11 block
12 block
13 block
14 block
15 block
16 block
17 block
20 block
21 block
22 block
23 block
24 block
25 block
26 block
27 block
28 block
30 bubble
31 bubble
32 bubble
35 bubble
36 bubble
37 bubble

The invention claimed is:

1. A car audio entertainment system, comprising:
a car audio equipment;
an other electronic device;
at least one data connection and at least one control connection between the car audio equipment and the other electronic device,
wherein the car audio equipment is configured to send test data to the other electronic device which is configured to respond to the test data sent by the car audio equipment by sending a data answer,
wherein the car audio equipment compares the test data sent to the other electronic device and the data answer received from the other electronic device to obtain a comparison result, and generates a control signal in accordance with the comparison result causing the other electronic device to be controlled by the car audio equipment; and
wherein the car audio equipment creates an inverse transformation of the test data, optionally, an inverse Fourier-Transformation.

2. System according to claim 1, wherein the car audio equipment creates a series of numbers as a reference sample.

3. System according to claim 2, wherein the car audio equipment maps bits to frequencies of series of numbers of the reference sample.

4. System according claim 1, wherein the car audio equipment sends the test data to the other electronic device and the other electronic device stores the test data.

5. System according to claim 1, wherein the other electronic device plays back the test data and sends a data answer to the car audio equipment, and the car audio equipment creates a transformation, optionally, a Fourier-Transformation, of the data answer and extracts bits from the frequencies.

6. System according to claim 1, wherein the comparison result reflects correspondence between the test data and the data answer.

7. System according to claim 6, wherein when the comparison result reflects at least a predetermined level of correspondence, audio data from the electronic device other than the test data is made audible by the car audio equipment.

8. System according to claim 6, wherein when the comparison result reflects less than a predetermined level of correspondence, sound playback by the car audio equipment is prevented.

9. A method of controlling an electronic device from a car audio equipment, there being at least one data connection and at least one control connection between the car audio equipment and the other electronic device, comprising:
the car audio equipment sending test data to the other electronic device;
the other electronic device responding to the test data sent by the car audio equipment by sending a data answer,
the car audio equipment comparing the test data sent and the data answer received to obtain a comparison result, and generating a control signal in accordance with the comparison result to allow the control of the other electronic device by the car audio equipment; and
wherein the car audio equipment creates an inverse transformation of the test data, optionally, an inverse Fourier-Transformation.

10. The method according to claim 9, wherein the car audio equipment creates a series of numbers as a reference sample.

11. The method according to claim 10, wherein the car audio equipment maps bits to frequencies of series of numbers of the reference sample.

12. The method according to claim 10, wherein the car audio equipment sends the test data to the other electronic device and the other electronic device stores the test data.

13. The method according to claim 9, wherein the other electronic device plays back the test data and sends the data answer to the car audio equipment, and the car audio equipment creates a transformation of the data answer, optionally, a Fourier-Transformation, and extracts bits from the frequencies.

14. The method according to claim 9, wherein the comparison result reflects correspondence between the test data and the data answer.

15. The method according to claim 14, wherein when the comparison result reflects at least a predetermined level of correspondence, audio data from the electronic device other than the test data is made audible by the car audio equipment.

16. The method according to claim 14, wherein when the comparison result reflects less than a predetermined level of correspondence, sound playback by the car audio equipment is prevented.

* * * * *